US007240437B1

(12) United States Patent
Moldovan

(10) Patent No.: US 7,240,437 B1
(45) Date of Patent: Jul. 10, 2007

(54) PIPE SIZING AND ALIGNMENT DEVICE

(76) Inventor: Emilian Moldovan, 912 NE. 174th Ave., Portland, OR (US) 97030

( * ) Notice: Subject to any disclaimer, the term of this patent is extended or adjusted under 35 U.S.C. 154(b) by 0 days.

(21) Appl. No.: 11/384,794

(22) Filed: Mar. 20, 2006

(51) Int. Cl.
*G01B 5/25* (2006.01)
(52) U.S. Cl. .................. 33/529; 33/DIG. 21; 33/286
(58) Field of Classification Search ............... 33/286, 33/379, 381, 382, 412, 529, DIG. 21
See application file for complete search history.

(56) References Cited

U.S. PATENT DOCUMENTS

| 2,334,422 | A | * | 11/1943 | Lehnus | 33/529 |
|---|---|---|---|---|---|
| 2,502,660 | A | * | 4/1950 | McLean | 33/529 |
| 2,717,454 | A | * | 9/1955 | Sekki | 33/529 |
| 2,832,152 | A | * | 4/1958 | Blackshaw | 33/529 |
| 2,893,131 | A | * | 7/1959 | De Peu | 33/529 |
| 6,052,911 | A | * | 4/2000 | Davis | 33/286 |
| 6,415,518 | B1 | * | 7/2002 | Sims | 33/286 |
| 6,505,412 | B2 | * | 1/2003 | Hauzie, Jr. | 33/529 |
| 6,560,887 | B2 | * | 5/2003 | Byrnes | 33/529 |
| 6,628,378 | B1 | * | 9/2003 | Marangoni et al. | 33/286 |
| 2006/0213069 | A1 | * | 9/2006 | Martin | 33/286 |

* cited by examiner

*Primary Examiner*—G. Bradley Bennett
(74) *Attorney, Agent, or Firm*—Mark S. Hubert

(57) ABSTRACT

The present invention relates to an improved pipe sizing and alignment device that can quickly and precisely attach it's concave base to, and align itself with the horizontal axis of a circular, main pipe. Through the use of multiple lasers, one of which is mounted to an adjustable arm that pivots about the center of a graduated protractor mounted on the concave base, the device can be located along the main pipe and the collimated beam of light from the laser directed at a distant plumbing component. This shows the specific fitting location for a tie in between the main pipe and plumbing component that will allow the horizontal axis of the main pipe to remain true to it's original spatial position with respect to the building structure. An electronic distance measuring device, also mounted to the adjustable arm, precisely indicates distance.

18 Claims, 5 Drawing Sheets

PIPE SIZING AND ALIGNMENT DEVICE

FIELD OF THE INVENTION

The present invention relates to an improved apparatus for the proper alignment of pipe and tubing as used for plumbing runs. The dual laser system allows for the proper placement and alignment of the main plumbing line and the precise location on this line for the connection and tie in of secondary lines. The distance measuring capability allows the plumber to cut the pipe and attach fittings for each secondary line based on line of sight measurements made from the main line. More specifically, it relates to a new measuring and alignment apparatus specifically designed for the plumbing contractor, that will minimize field construction (fit-up) time.

BACKGROUND

The installation of commercial and residential plumbing generally is based upon a larger diameter, main drain line into which all the smaller diameter, secondary drain lines feed. The main line, from inlet to outlet is sloped accordingly, and is constructed in stages, adding each of the secondary lines to it along the way. Unlike water supply lines, drain line geometry is critical. The slope, linearity and secondary line connections are crucial to maintaining proper flow rates so as to allow the removal of solids and fluids without clogging. Since plumbing connectors or "tees" come in standard angles, the specific location of the tie in points for these tees along the main drain line is the critical element for alignment of the overall plumbing system. Plumbers generally utilize multiple, time consuming measurements and field fitting techniques to accomplish this proper alignment.

With the recent availability of cheap laser technology, there has become available a plethora of laser measuring or position indicating construction aids. Most of these are designed to be attractive to the "jack of all trades" handymen as general measuring aids capable of horizontal and vertical plane use for roof pitch layout, stair riser layout, piping layout, wall and floor layout. The initial positioning of such general purpose devices must be applicable to a variety of locations, most of which are planar surfaces. The present invention is directed to use for horizontal plane measurement and indication with piping only, and has a size adjustable concave base that ensures both a stable base on the round pipe and immediate longitudinal alignment with the piping run. This allows a quick setup for the determination of distances, locations and horizontal, planar angles relative to the device's position.

Such operational advantages as provided by the apparatus for the proper alignment of pipe and tubing, as the present invention provides, overcome the pitfalls of the prior art and is a cheap, simple solution that allows a considerable savings in the field assembly and construction of plumbing components in commercial and residential plumbing.

SUMMARY OF THE INVENTION

The general purpose of the present invention, which will be described subsequently in greater detail, is to provide an economical, simple device to allow a plumbing contractor to quickly and accurately determine the length of pipe needed and the specific location for fittings, while ensuring proper alignment of both the main and secondary drain lines with respect to the building and the plumbing fixture drain fittings.

It has many of the advantages mentioned heretofore and many novel features that result in a laser pipe sizing and alignment device which is not anticipated, rendered obvious, suggested, or even implied by any of the prior art, either alone or in any combination thereof.

In accordance with the invention, an object of the present invention is to provide an improved pipe sizing and alignment device that is easily operated and accurate enough to minimize field measurements and fit up operations.

It is another object of this invention to provide an improved pipe sizing and alignment device that is easily and quickly aligned with the horizontal axis of any diameter round pipe.

It is a further object of this invention to provide an improved pipe sizing and alignment device that is simple and economical to construct.

It is yet another object of the present invention to provide a pipe sizing and alignment device that can measure accurate distances and angles with respect to the horizontal axis of a pipe the device is supported on.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The present invention relates to a pipe sizing and alignment device, that utilizes lasers to indicate the correct positioning for piping connectors considering the main drain pipe line alignment, main and secondary line slopes, and angle of the fitting. With the laser distance measuring device, it also determines the correct length of pipe to be used as a secondary line to connect the main line to the other plumbing system components.

Figure 10:
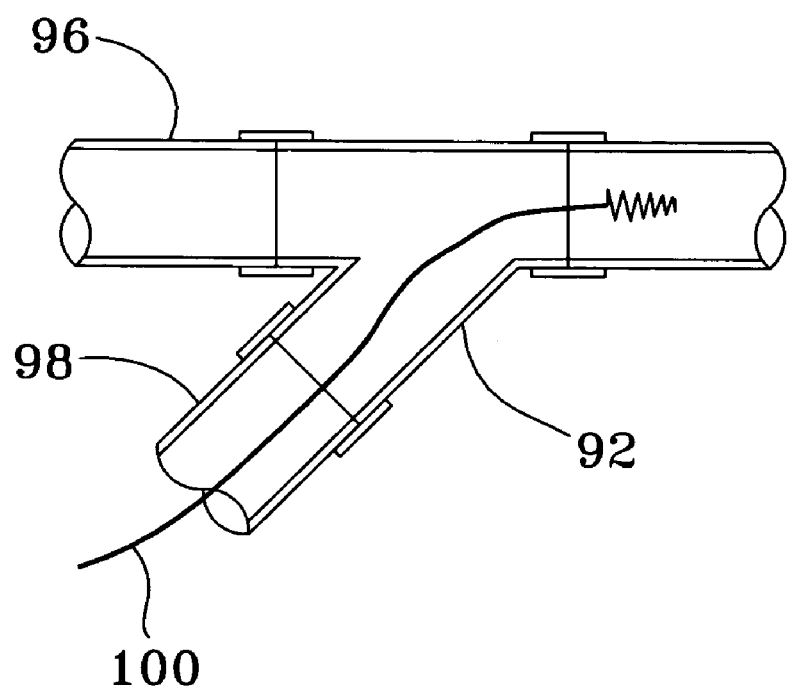
FIG. 10 is a cross sectional view of a treed piping system with a snake.
Figure 11:
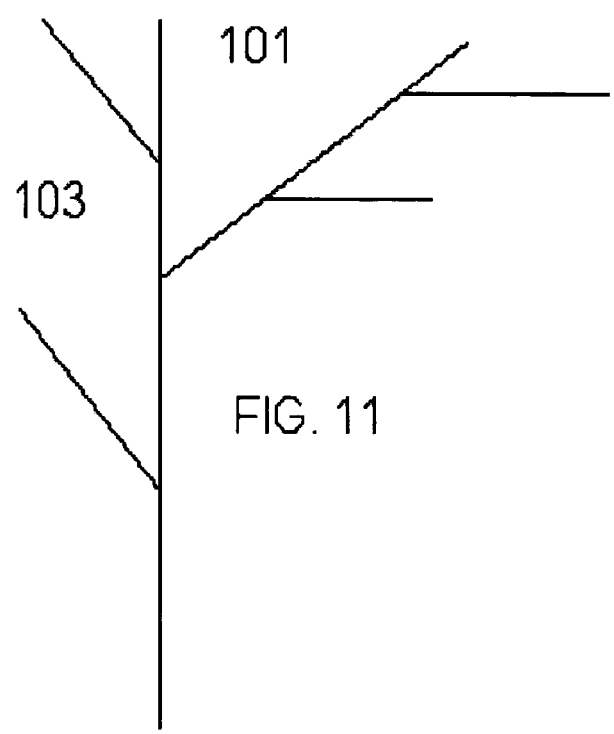
FIG. 11 is a representative perspective drawing of a treed piping layout.
Figure 12:
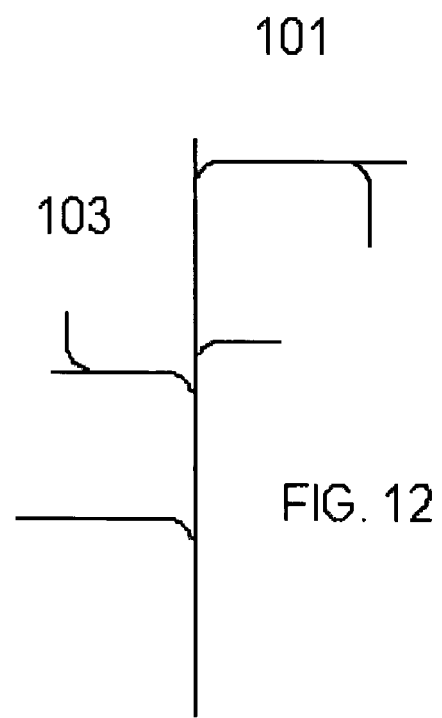
FIG. 12 representative perspective drawing of a conventional piping layout.

The most logical plumbing system layout is a "treed" layout as illustrated in FIG. 11 wherein the secondary lines 101 tie into the main line 103 at an acute angle. However, this requires much more accurate alignment of the main and secondary lines. For this reason it is more common to tie in the secondary lines 101 normal to the main line 103. This traditional layout is illustrated in FIG. 12. The advantage of using a treed layout vs a conventional layout can be seen with reference to FIGS. 9 and 10.

Figure 9:
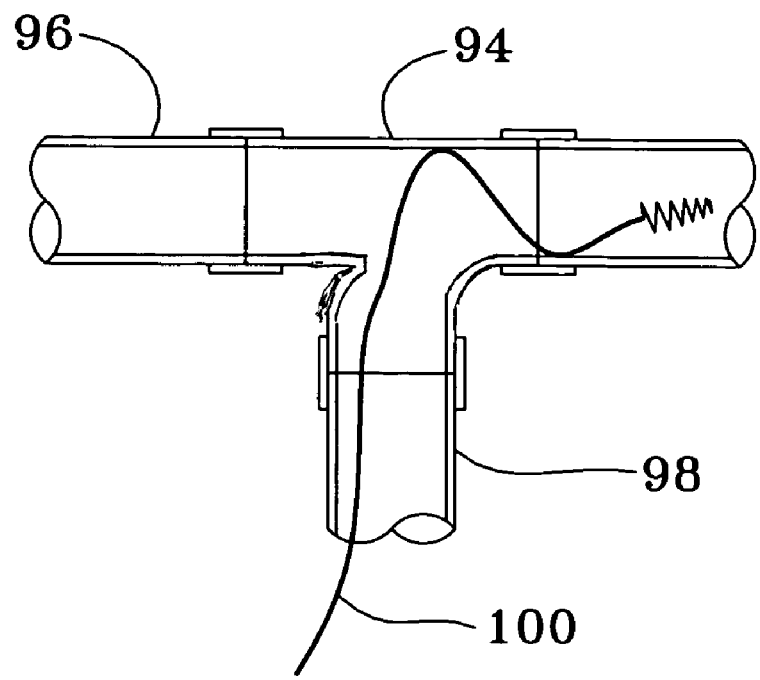
FIG. 9 is a cross sectional view of a conventional branched piping system with a snake.

In FIG. 9 it can be seen that when there is a blockage in a conventionally plumbed system and a snake 100 is needed to clear it, the snake 100 from the secondary line 98 strikes the main line 96 normally at the 90 degree tee 94 and then undergoes extreme bending and wall contact. This increases the friction and effort required to clear a line, often to the point where it is impossible to do.

In FIG. 10 it can be seen that when a 45 degree tee 92 is used, as in a treed plumbed system, the snake 100 is guided correctly and in alignment with the main line 96. The present invention evolved from the need for a simple and accurate method of constructing a treed plumbing system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings.

The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
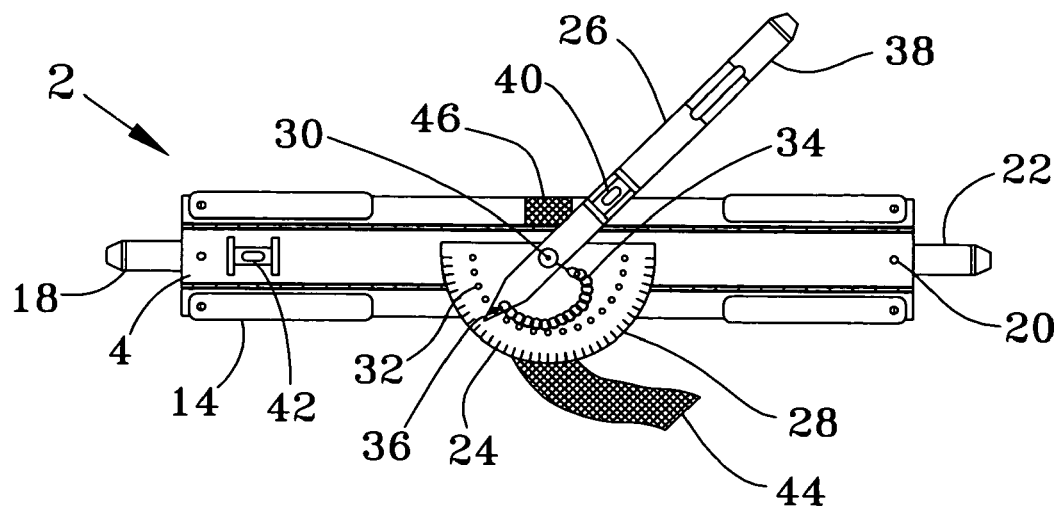
FIG. 1 is a top view of the preferred embodiment pipe sizing and alignment device with a 180 degree protractor.
Figure 2:
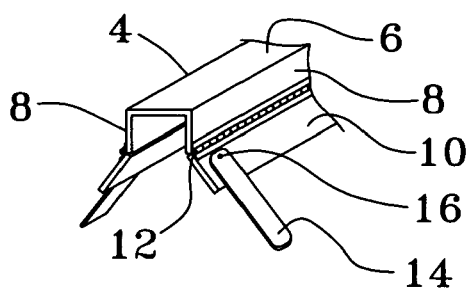
FIG. 2 is a end perspective view of the base of the pipe sizing and alignment device with the extension arms pivoted normal to the base.

Looking at FIGS. 1 and 2, the general configuration of the preferred embodiment device 2 and most of it's components can be seen. Linear base 4 has a concave configuration formed by two substantially similar side plates 8 which project normally from the top plate 6 and are held in a parallel configuration with respect to each other. Base plates 10 are hingedly attached to side plates 8 by a sprung or self-closing piano hinge 12. Extension arms 14 are pivotally mounted at the distal and proximate ends of base plates 10 and mechanically affixed by pin 16. First laser emitting light 18 and second laser emitting light 22 are mechanically affixed to the underside of top plate 6 by mechanical fasteners. The laser emitting lights are mounted so that the axes of the laser light beams that they emit are parallel to the longitudinal axis of base 4. The longitudinal axes of first laser emitting light 18 and second laser emitting light 22 are in linear alignment and the directions of their laser light beams are 180 degrees apart. Graduated 180 degree protractor plate 24 is mechanically affixed to top plate 6 such that graduated scale 28 is visible. Pivot arm 26 is mounted to top plate 6 by pivot pin 30 that passes through the point of angular origin of 180 degree protractor plate 24 and the midpoint of the longitudinal axis of top plate 6. Pivot arm 26 is held is a spaced parallel arrangement with the protractor plate 24 and is free to pivot about the protractor plate's point of angular origin while remaining adjacent and parallel to the protractor plate 24.

180 degree Protractor plate 24 has a series of orifices 32 defined therethrough that correspond to the common angles that pipe fittings are available in. A chain and pin arrangement 34 is attached at one end to the pivot arm 26 and free at the other end so that the pin may be simultaneously positioned through arm opening 36 at the pointed indicating back end of pivot arm 26 and any of the protractor plate orifices 32. Third laser emitting light 38 is mechanically affixed to the front end of pivot arm 26.

First bubble level vial 42 is affixed to top plate 6 such that the indicating axis of first vial 42 is aligned with the longitudinal axis of top plate 6. Second bubble level vial 40 is affixed to pivot arm 26 such that the indicating axis of second vial 40 is aligned with the longitudinal axis of pivot arm 26.

Flexible strap 44 is constructed of a loop style fabric and is attached at one end to one base plate 10 and releasably affixable to a hook style fastening pad 46 affixed to the other base plate 10. This hook and loop style fastener system is strong, quick to attach and easily releasable.

Figure 3:
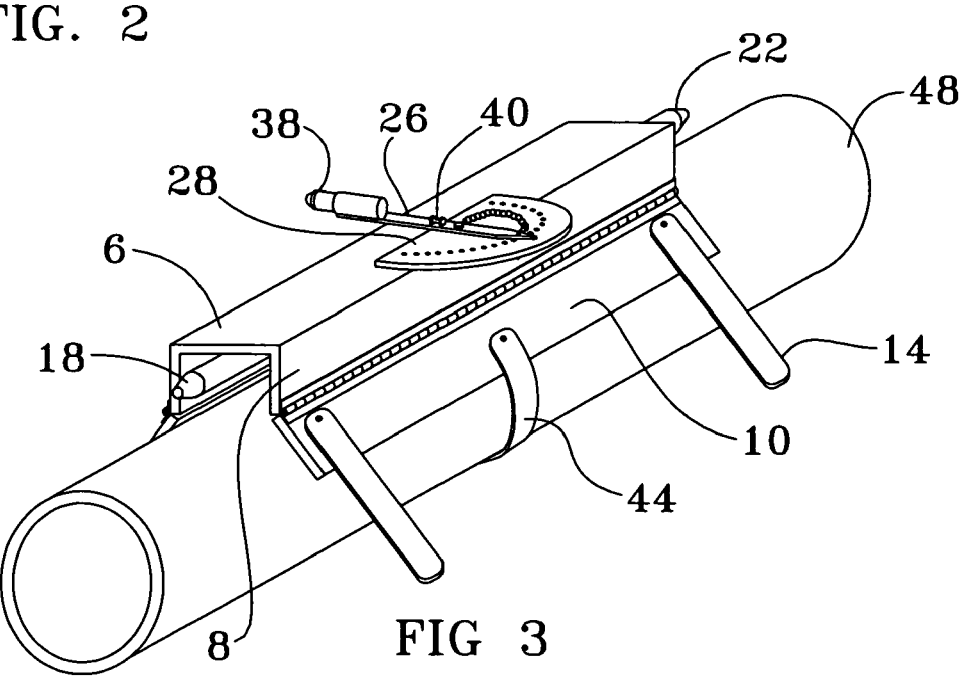
FIG. 3 is a perspective view of the preferred embodiment pipe sizing and alignment device with a 180 degree protractor, strapped onto a pipe.

Looking at FIG. 3, a perspective view of the preferred embodiment pipe sizing and alignment device with a 180 degree protractor, it can be seen that the concave design of linear base 4 allows for the device 2 to reside on the outer surface of pipe 48. In this manner the device 2 will align it's longitudinal axis and the axis of any laser light beam emitted from first laser emitting light 18 and second laser emitting light 22 as well as the indicating axis of first bubble level vial 42, parallel and adjacent to the longitudinal axis of pipe 48. However, the diameter of pipe 48 if large enough in relation to the distance between base plates 10, will prevent the device 2 from this proper alignment. Extension arms 14, when pivoted into the extended position as illustrated, allow stabilization and alignment of the device 2 on large diameter pipes.

Figure 4:
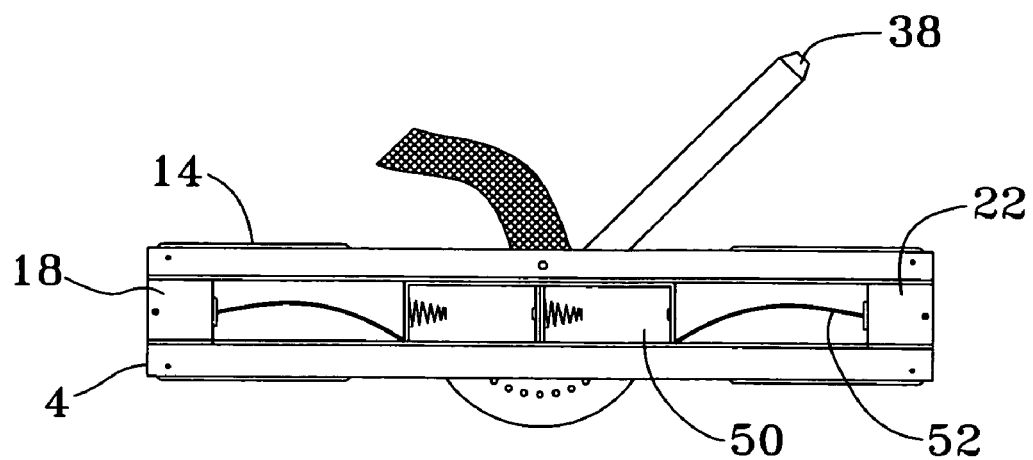
FIG. 4 is a bottom view of the preferred embodiment pipe sizing and alignment device with a 180 degree protractor and utilizing both pen and box lasers.

FIG. 4 is a bottom view of the preferred embodiment pipe sizing and alignment device 2 with a 180 degree protractor 24 and utilizing both pen and box style lasers. It can be seen that first laser emitting light 18 and second laser emitting light 22 are not of the pen style but rather of the box style laser and that battery housing 50 is mounted in the concavity of base 4. The battery housing transmits electrical power to each laser by hard wiring 52.

Figure 5:
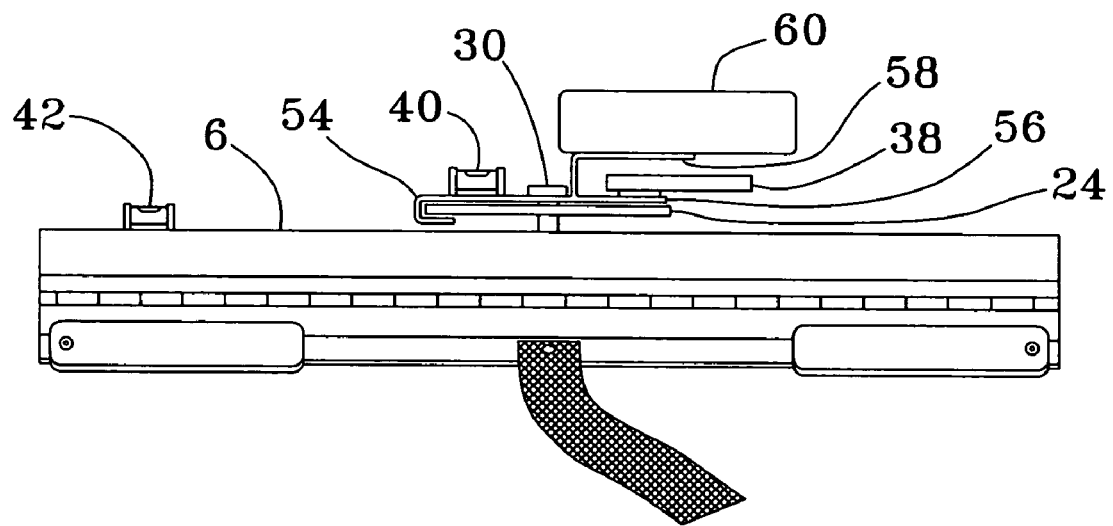
FIG. 5 is a side view of the alternate embodiment pipe sizing and alignment device with the laser distance measuring device.

Looking at FIG. 5, a side view of the alternate embodiment pipe sizing and alignment device, it can be seen that this device has modified pivot arm 54, similar to pivot arm 26 wherein it is mounted to top plate 6 by pivot pin 30 that passes through the point of angular origin of protractor plate 24 and the midpoint of the longitudinal axis of top plate 6. Modified pivot arm 54 is held is a spaced parallel arrangement with the protractor plate 24 and is free to pivot about the protractor plate's point of angular origin while remaining adjacent and parallel to the protractor plate 24. Modified pivot arm 54 has a forked end with a laser mounting plate 56 and an adjacent meter mounting plate 58 that reside parallel and vertically aligned with respect to each other. An electronic laser distance measuring meter 60 is mechanically mounted on the meter mounting plate such that the meter's emitted laser beam projects away from the protractor plate's point of angular origin. Third laser emitting light 38 is mechanically mounted on the laser mounting plate 56 such that the emitted laser beam from the laser emitting light projects away from the protractor plate's point of angular origin, but is in parallel and vertically alignment with respect to the meter's emitted laser beam and the longitudinal axis of device 2. On modified pivot arm 54, the second bubble level vial 40 is affixed such that the indicating axis of second vial 40 is aligned with the longitudinal axis of modified pivot arm 54.

Figure 6:
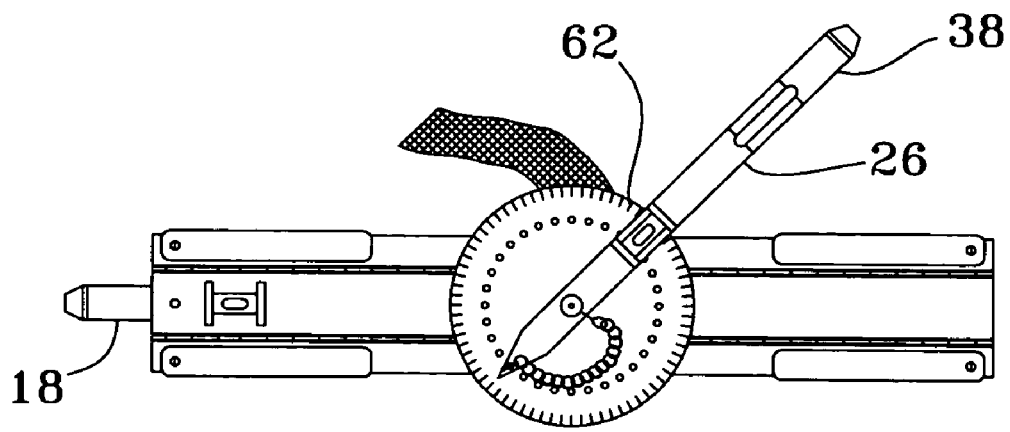
FIG. 6 is a top view of the preferred embodiment pipe sizing and alignment device with a 360 degree protractor.
Figure 7:
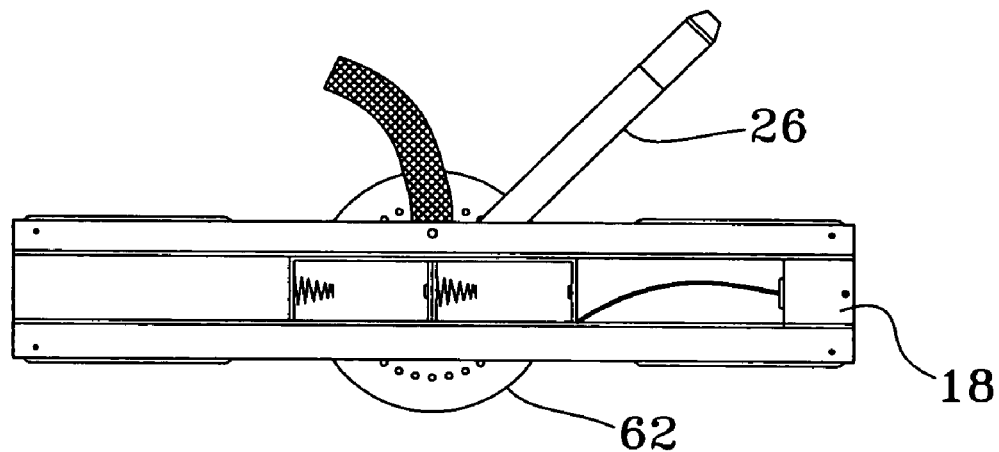
FIG. 7 is a bottom view of the preferred embodiment pipe sizing and alignment device with a 360 degree protractor and only one box laser.

FIGS. 6 and 7 show top and bottom views of variations of the preferred embodiment pipe sizing and alignment device 2. In FIG. 6 a 360 degree protractor plate 62 is used rather than the 180 degree protractor plate 24. This allows for the pivot arm 26 to swing and indicate graduated angular distances on both sides of the longitudinal axis of device 2. This eliminates the necessity for a second laser emitting light. Since the pivot arm 26 can indicate angles in 360 degrees, there is no need to rotate the device 2 end for end (180 degrees) on a pipe to sight in plumbing connections on alternate sides and first laser emitting light 18 may remain facing the final tie in for the main piping line.

FIG. 7 illustrates the bottom side of device 2 with a 360 degree protractor plate 62. Here a box style laser is substituted for the pen style laser of first laser emitting light 18 in FIG. 6. The lasers are interchangeable and function equally as well. The pen style lasers are easier to replace in the event of malfunction although it is known that any of a plethora of laser types are equally applicable and may be substituted for the pen laser. The 180 degree and 360 degree protractor plates have the same orifices corresponding to common pipe fitting angles and both utilize the same chain and pin arrangement 34.

Figure 8:
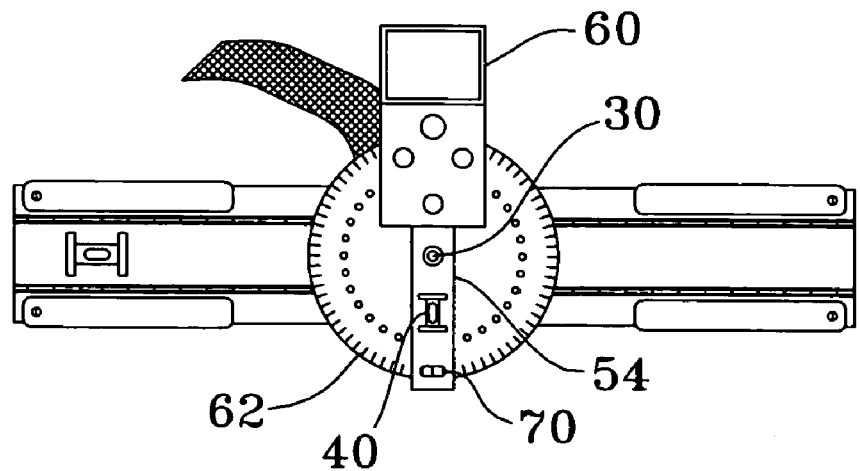
FIG. 8 is a top view of the alternate embodiment pipe sizing and alignment device with a 360 degree protractor and the laser distance measuring device.

FIG. 8 is a top view of the alternate embodiment pipe sizing and alignment device with a 360 degree protractor and the laser distance measuring device. From this illustration angle viewing orifice 70 modified pivot arm 54 can be seen.

The operation and application of the device 2 is very straightforward. The main plumbing line in a building is generally centrally located sloping from it's origin to it's final exit. Plumbing tie ins from above floor drains join the main line through secondary lines from both sides of the main line. The secondary lines must be tied into the main line as the system is built. Measurements for 90 degree tees can easily be made off of existing structures such as adjacent joists. Measurements for angled tees cannot. When the main line is being connected to it's origin the device 2 is placed on top of the main line. The device 2 due to it's base's concavity, will self align it's longitudinal axis to the longitudinal axis of the pipe. Since the longitudinal axis of the first laser emitting light is aligned with the longitudinal axis of the base 4, the laser beam emitted from the first laser emitting light 18 can be directed toward the final exit point. This will allow the main line to be oriented with respect to the origin connection so as to be linearly accurate. The slope of the main line may be verified or set by reference to first bubble level vial 42. If the final exit point is not yet determined, it can be in the same manner. By sliding the device 2 along the main line with the pivot arm 26 set at the angle corresponding to the desired tee fitting (I.E. 45 degrees) until the laser light beam from the third laser emitting light 38 strikes the desired above floor drain, the point for the tie in with the desired angled tee is ascertained. This will also require counter clockwise rotation of the device 2 about the main pipe to set or verify the proper slope of the secondary line with the second bubble level vial 40 on pivot arm 26. When using the device 2 with a 180 degree protractor, the device 2 must be rotated end for end on the main pipe for use with above floor drains on the other side of the main pipe. This is the reason that the device 2 with the 180 degree protractor plate utilizes second laser emitting light 22 at the opposite end of base 4. Only one laser emitting light is required when a 360 degree protractor plate is used since the pivot arm cam rotate through 360 degrees. When the electronic laser distance measuring meter 60 is utilized it determines accurately the distance between the tie in location on the main pipe and the above floor drain or final exit point.

Following this procedure, when using the device 2, accurate alignment and pipe length sizing can easily and quickly be accomplished between all secondary and main lines, while maintaining linearity between the origin and final exit point.

Thus it can be seen that the device 2 is specifically designed to accurately determine the length of pipe needed and the specific location for fittings, while ensuring proper alignment of both the main and secondary drain lines with respect to the building and the plumbing fixture drain fittings.

Experimentation has shown that Class IIIA red laser light beams (645-655 nM wavelength) in the current operation range of 20-40 mA are not clearly distinguishable from background light in many construction settings. The green (532 nM wavelength) laser light beam in the 180 mA current operating range performs best and emits a collimated light beam that is visible to the human eye. While these power levels and frequencies of lasers are suitable for this application, it is known that since laser technology is diverse and rapidly advancing, other laser emitting light sources are, or will come into existence, that will be better suited for this application.

The electronic distance measuring tool is of the laser type, which is well known in the industry. It emits a pulse of laser at an object and measures the time it takes to receive the rebounded light. The onboard computer of the device applies an algorithm to the brief period of rebound time and computes the distance to the object and displays this on a digital display. Because the speed of light is constant, the distance is computed with exacting accuracy.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. Although discussed in relation to use with larger diameter drain lines, it is known that this device is applicable to use with supply lines as well.

Having thus described the invention, what is claimed as new and desired to be secured by Letters Patent is as follows:

1. A pipe sizing and alignment device for determining the placement of specific angled pipe fittings along a circular pipe comprising:

a base with a top plate, a first side plate, and a second substantially similar and parallel side plate, wherein said side plates extend normally from said top plate and in a parallel planar configuration so as to form a concave linear member having a front end and a rear end;

a third side plate pivotally attached to a longitudinal edge of said first side plate;

a fourth side plate pivotally attached to a longitudinal edge of said second side plate;

a graduated protractor plate mechanically affixed to said base such that a point of angular origin of said protractor resides substantially above a midpoint of a longitudinal axis of said base;

a first laser emitting light rigidly mounted at said front end of base between said first side plate and said second side plate such that when a first coherent, collimated, laser light beam is emitted it has a linear axis parallel to said longitudinal axis of said base;

an arm attached to said protractor plate by a pivot member passing through said point of angular origin so as to allow said arm to pivot about said protractor's point of angular origin while remaining adjacent and parallel to said protractor plate; and a second laser generating light mechanically affixed to said arm and adapted for emitting a second coherent, collimated, laser light beam having a linear axis parallel to a longitudinal axis of said pivotable arm;

wherein, when said base is placed onto a circular pipe and said first laser light beam is shone on the destination point of said pipe, said arm may be pivoted to a desired pipefitting angle, said second laser light activated and said base slid along said pipe until said second laser light beam is shone onto the center of the source of a secondary pipe thereby indicating the proper location for a pipefitting of the desired angle.

2. The pipe sizing and alignment device of claim 1 further comprising:

a first air bubble leveling vial affixed to said base such that a leveling axis of said first vial is parallel with said longitudinal axis of said base;

a second air bubble leveling vial affixed to said arm such that a leveling axis of said second vial is parallel with said longitudinal axis of said arm.

3. The pipe sizing and alignment device of claim 2 further comprising a releasable retention strap adapted for mechanical attachment at a first end to said third side plate and at a second end to said fourth side plate, so as to encircle said pipe and hold said base securely onto a circular pipe.

4. The pipe sizing and alignment device of claim 3 wherein said third side plate and said fourth side plate each have two pivotable extension plates mounted thereon.

5. The pipe sizing and alignment device of claim 4 further comprising a laser, distance measuring device affixed to said pivotable arm and residing adjacent to said second laser generating light such that a longitudinal axis of a laser light beam emitted from said distance measuring device has a linear axis parallel to said longitudinal axis of said arm.

6. The pipe sizing and alignment device of claim 5 wherein said protractor plate is a circular 360 degree protractor.

7. The pipe sizing and alignment device of claim 5 wherein said protractor plate is a semicircular 180 degree protractor.

8. The pipe sizing and alignment device of claim 6 further comprising a third laser emitting light rigidly mounted at a rear end of said base between said first side plate and said second side plate such that a third coherent, collimated, laser light beam is emitted having a linear axis parallel to said longitudinal axis of said base.

9. The pipe sizing and alignment device of claim 7 further comprising a third laser emitting light rigidly mounted at a rear end of said base between said first side plate and said second side plate such that a third coherent, collimated, laser light beam is emitted having a linear axis parallel to said longitudinal axis of said base.

10. The pipe sizing and alignment device of claim 8 wherein said pivotal attachment between said third side plate and said first side plate, and between said fourth side plate said second side plate is a self closing piano hinge.

11. The pipe sizing and alignment device of claim 9 wherein said pivotal attachment between said third side plate and said first side plate, and between said fourth side plate said second side plate is a self closing piano hinge.

12. The pipe sizing and alignment device of claim 8 wherein all laser emitting lights project a green light having a current operating range greater than 180 mA.

13. The pipe sizing and alignment device of claim 9 wherein all laser emitting lights project a green light having a current operating range greater than 180 mA.

14. The pipe sizing and alignment device of claim 8 wherein said arm is lockingly engageable with said protractor plate at fixed angles relative to the longitudinal axis of said base and corresponding to the common angles of pipefittings.

15. The pipe sizing and alignment device of claim 9 wherein said arm is lockingly engageable with said protractor plate at fixed angles relative to the longitudinal axis of said base and corresponding to the common angles of pipefittings.

16. The pipe sizing and alignment device of claim 8 wherein said first laser emitting light, said second laser emitting light and said third laser emitting light are of a penlight configuration.

17. The pipe sizing and alignment device of claim 9 wherein said first laser emitting light, said second laser emitting light and said third laser emitting light is of a penlight configuration.

18. A pipe sizing and alignment device adapted for determining the placement of specific angled pipe fittings in the assembly of a plumbing system comprising:

a rigid, concave, linear base having a top plate and two substantially similar and parallel side plates each joined along a first edge to said top plate and along a second edge to a first side of a piano hinge wherein said base has a front end and a back end;

two substantially similar self closing, piano style hinges each having a first side and a second side and residing between one of said side plates and a base plate;

two substantially similar base plates each having two pivoting extension arms wherein each said base plate is joined along one edge to said second side of one of said piano hinges;

a 360 degree protractor mechanically affixed to said base such that a midpoint of said protractor resides substantially above a midpoint of said base's longitudinal axis;

an arm positioned adjacent and parallel to said protractor and pivotable about said protractor's midpoint, wherein said arm is lockingly engageable with said protractor at fixed angles relative to the longitudinal axis of said base and corresponding to the common angles of pipe fittings;

a first laser generating light adapted for emitting a first coherent, collimated, green light beam having a linear axis parallel to a longitudinal axis of said base, wherein said first laser light is affixed inside said concavity at said front end of said base and projects said beam forward;
a second laser generating light adapted for emitting a second coherent, collimated, green light beam having a linear axis parallel to a longitudinal axis of said base, wherein said second laser light is affixed inside said concavity at said back end of said base and projects said beam rearward;
a third laser generating light adapted for emitting a third coherent, collimated, green light beam having a linear axis parallel to a longitudinal axis of said pivotable arm;
a first bubble level vial affixed to said base such that a linear axis of said first vial is parallel with said linear axis of said base;
a second bubble level vial affixed to said arm such that a linear axis of said second vial is parallel with said longitudinal axis of said arm;
a retention strap having two ends and adapted for mechanical attachment at each end to one of said base plates so as to hold said base securely onto a circular pipe; and
a laser, distance measuring device affixed to said pivotable arm and residing adjacent to said third laser generating light such that a longitudinal axis of said measuring device is parallel to said longitudinal axis of said pivotable arm and said linear axis of said third light beam.

* * * * *